United States Patent [19]
Protiva et al.

[11] 3,910,916
[45] Oct. 7, 1975

[54] 1-(4-METHANESULFONYL PHENACYL)-4-PHENYL PIPERAZINE

[75] Inventors: Miroslav Protiva; Zdenek Vejdelek; Jan Metys, all of Prague; Frantisek Hradil, Pardubice, all of Czechoslovakia

[73] Assignee: SPOFA United Pharmaceutical Works, Prague, Czechoslovakia

[22] Filed: Dec. 26, 1973

[21] Appl. No.: 427,568

[30] Foreign Application Priority Data
Dec. 22, 1972  Czechoslovakia .................. 8872-72

[52] U.S. Cl. .... 260/268 PH; 260/570.5 C; 424/250

[51] Int. Cl.² ...................................... C07D 295/10
[58] Field of Search .............................. 260/268 PH

[56] References Cited
UNITED STATES PATENTS

| | | | |
|---|---|---|---|
| 2,636,032 | 4/1953 | Weston et al. | 260/268 SY |
| 3,170,926 | 2/1965 | Ash et al. | 260/268 SY |

*Primary Examiner*—Donald G. Daus
*Assistant Examiner*—Jose Tovar

[57] ABSTRACT

Novel 1,4-disubstituted piperazine derivatives and their salts and methods of producing them, and use of said compounds as sedation agents.

1 Claim, No Drawings

1-(4-METHANESULFONYL PHENACYL)-4-PHENYL PIPERAZINE

This invention relates to new 1,4-disubstituted piperazine derivatives of the general formula I

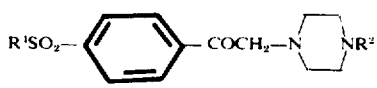

wherein $R^1$ designates an alkyl group with 1 to 4 carbon atoms or a secondary aliphatic, araliphatic or saturated heterocyclic amino group with 2 to 8 carbon atoms, and $R^2$ designates an alkyl group with 1 to 4 carbon atoms, a phenyl group or a phenyl group substituted on the nucleus with a halogen atom or with a methyl group, the salts thereof and the methods of producing them.

The said compounds, particularly 1-(4-methanesulfonylphenacyl)-4-phenylpiperazino, exhibit an intense central sedative activity which is not accompanied by cataleptic activity, and therefore they act as selective sedatives of extraordinary low toxicity, without any significant undesirable side effects.

According to this invention, the new compounds of general formula I are prepared e.g. by reaction of phenacyl halides of the general formula II

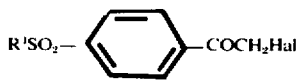

wherein $R^1$ designates the same groups as in formula I and Hal is an atom of halogen, preferably chlorine or bromine, with piperazine derivatives of the general formula III

wherein $R^2$ designates the same groups as in formula I, whereupon the basic products obtained are transformed into corresponding salts by neutralization with pharmacodynamically harmless inorganic or organic acids. The reaction is preferably carried out using an excess of the piperazine derivative of the general formula III in an inert solvent at the temperature of the boiling point of the mixture. If a 100% excess of the piperazine derivative of the general formula III is used, this derivative acts simultaneously as a condensing agent, which binds the evolved hydrogen halide and which can be regenerated by working up the reaction mixture. Benzene appears to be a very advantageous solvent, if the reaction is carried out at the temperature of its boiling point. In chloroform the reaction takes place with sufficient velocity at room temperature; this is advantageous because of the tendency of the product to undergo side reactions at higher temperatures. The most advantageous of the phenacyl halides of general formula II are bromides (Hal = Br); Some of them are known and some are new compounds. The preparation of the new intermediates is described in the Examples hereinbelow.

A modification of the method of preparing the compounds of general formula I according to this invention consists in the reaction of a bis(2-halogenoethyl)amine of the general formula IV

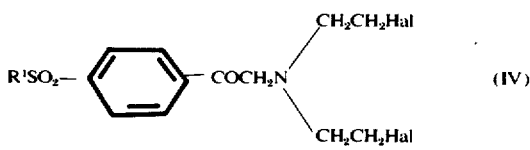

wherein $R^1$ designates the same group as in formula I and Hal the same as in formula II, with primary amines of the general formula V $$R^2NH_2 \qquad (V)$$

wherein $R^2$ designates the same groups as in formula I. This reaction is carried out by heating equivalent amounts of both components either without solvent or in suitable solvents, such as lower aliphatic alcohols (methanol to n-butanol), benzene and its homologues, chloroform and the like. The optimum reaction temperature lies in the range of 60°–100°C. When using volatile aliphatic amines, such as methylamine or ethylamine, as the primary amines of general formula V, the reaction is carried out in a sealed ampoule or in an autoclave. Whereas the amines of general formula V are well known compounds, compounds of general formula IV are new and therefore their preparation is described in the Examples.

Another modification of the method of preparing the compounds of general formula I according to this invention consists in a reaction of amino ketones of general formula VI

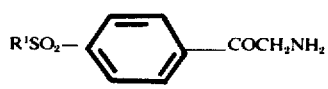

wherein $R^1$ has the same significance as in the formula I, with bis(2-halogenoethyl)amines of the general formula VII

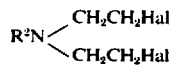

wherein $R^2$ designates the same groups as in the formula I and Hal has the same significance as in formula II. Also in this case the reaction is carried out by heating both components to temperatures ranging from 60° to 100°C. either without solvent or in suitable solvents, preferably in lower aliphatic alcohols, benzene and its homologues, chloroform, dimethylformamide and the like.

The compounds of the general formula I are bases: this feature is important for their isolation from the reaction mixture and also for the preparation of their salts by neutralization with pharmacodynamically harmless inorganic or organic acids. This neutralization step is also an integral part of the method according to the invention. Like the bases, the salts obtained are crystalline compounds which are a little more soluble

EXAMPLES

1-(4-Methanesulfonylphenacyl)-4-phenylpiperazine

1. A warm (30°–35°C.) solution of 4-methanesulfonylphenacyl bromide (168 g) (prepared according to C. M. Suter and coworkers, J. Am. Chem. Soc. 75, 4330, 1953) in chloroform (2500 ml) is added during 5 minutes to a stirred solution of 1-phenylpiperazino (200 g) (prepared according to C. B. Pollard and L. G. McDowell, J. Am. Chem. Soc. 56, 2199, 1943) in chloroform (600 ml). The mixture is stirred for 2.5 hours at room temperature, then warmed to 30°C. and the precipitated phenylpiperazine hydrobromide is filtered off. From this precipitate a considerable portion of phenylpiperazine can be regenerated by decomposition with alkali hydroxides. The chloroform filtrate is evaporated under reduced pressure, the remaining solid base is mixed with ethanol (500 ml) to which aqueous ammonia (15 ml) has been added, and the mixture is filtered; the solid obtained is washed with ethanol (200 ml) and air-dried. The yield of the light yellow product, m.p. 164°–166°C. is 206 g. (95%). A completely pure product is obtained by recrystallization of the crude base from an ethanol-benzene mixture; it then melts at 177°–178°C. and its analysis is in accord with the anticipated composition $C_{19}H_{22}N_2O_3S$.

A solution of this base (26 g) in warm chloroform (320 ml) is treated with a solution of maleic acid (8.5 g) in warm ethanol (20 ml). The following day the separated crystalline maleate is filtered off and combined with the product obtained by concentration of the mother liquor, affording thus 30.0 g of the crude maleate, m.p. 167°–169°C. The pure product is obtained by recrystallization either from a large volume of ethanol or from a mixture of dimethylformamide, ethanol, and water; it melts at 169°–170°C and its composition is $C_{23}H_{26}N_2O_7S$.

A solution of methanesulfonic acid (2.7 g) in ethanol (40 ml) is added to a solution of the base (10 g) in chloroform (150 ml). Ethanol (300 ml) and ether (100 ml) are added, and the mixture is allowed to stand overnight. The separated crystalline methanesulfonate is filtered off, yielding 10.3 g. Recrystallization from a large volume of an ethanol-ether mixture yields the pure compound, m.p. 216°–217°C. composition $C_{20}H_{26}N_2O_6S_2$.

2. A stirred mixture of the crude base of N,N-bis(2-chloroethyl)-4-methanesulfonylphenacylamine (33.8 g), aniline (9.3 g) and 1-butanol (250 ml) is heated to 100°C for 8 hours. The solvent is then evaporated under reduced pressure, the residue is triturated with aqueous ammonia (200 ml), the crude solid product is filtered off, washed with a small amount of ethanol and air-dried. Recrystallization of the crude base from dimethylformamide (100 ml), heated to a maximum of 35°C., affords the pure product, m.p. 177°–178°C., identical with the product prepared according to Example 1 above.

The starting material, N,N-bis(2-chloroethyl)-4-methanesulfonylphenacylamine has not been hitherto described in the literature and is prepared by the following procedure:

A solution of diethanolamine (13.5 g) in chloroform (30 ml) is added to a solution of 4-methanesulfonylphenacyl bromide (25.5 g) in chloroform (300 ml); the resulting mixture is stirred for 2 hours at room temperature and then set aside overnight. The separated solid is removed by filtration, the filtrate is washed thoroughly with water and evaporated, yielding the desired N,N-bis(2-hydroxyethyl)-4-methanesulfonylphenacylamine, melting in the crude state at 134°–136°C.

A mixture of crude N,N-bis(2-hydroxyethyl)-4-methanesulfonylphenacylamine (10.0 g) from the preceding preparation and thionyl chloride (30 ml) is heated for 2.5 hours under reflux. Then the excess thionyl chloride is evaporated under reduced pressure, the residue is decomposed with water (150 ml) and aqueous ammonia (50 ml), and the product isolated by extraction with a large volume of warm chloroform. Evaporation of the solvent affords the crude amorphous base of N,N-bis(2-chloroethyl)-4-methanesulfonylphenacylamine which is unstable and which is therefore used further in a crude state without any purification.

3. A mixture of 4-methanesulfonylphenacylamine (21.3 g) (see C. M. Suter and coll., J. Am. Chem. Soc. 75, 4330, 1953; L. L. Bambas, U.S. Pat. 2,721,207; Chem. Abstr. 50, 10130h, 1956), 1-butanol (250 ml) and N,N-bis(2-chloroethyl)aniline (21.8 g) (see R. Robinson and J. S. Watt, J. Chem. Soc. 1934, 1536; V. V. Korsak and J. A. Strepichjejev, Zh. Obsch. Chim. 14, 312, 1944, Chem. Abstr. 39, 3790, 1945) is heated to 100°C for 8 hours with stirring. The solvent is then evaporated under reduced pressure, the residue is triturated with aqueous ammonia (200 ml) the solid crude base of the product is filtered off, washed with a small amount of ethanol and dried in air. The crude base is dissolved in dimethylformamide (100 ml) at 85°C., the solution is filtered and the filtrate is set aside. The desired base which crystallizes, has a m.p. 177°–178°C. and is identical with the product obtained according to the Examples 1 and 2 above.

What is claimed is:

1. 1-(4-Methanesulfonylphenacyl)-4-phenylpiperazine or the corresponding maleate.

* * * * *